(12) United States Patent
Illsley et al.

(10) Patent No.: US 10,501,648 B2
(45) Date of Patent: Dec. 10, 2019

(54) RADIATION-CURABLE INKJET INKS AND COATINGS

(71) Applicant: SUN CHEMICAL CORPORATION, Parsippany, NJ (US)

(72) Inventors: Derek Illsley, Bath (GB); Damian Ward, Radstock (GB); Stephen Hall, Wells (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 15/324,037

(22) PCT Filed: Jul. 8, 2015

(86) PCT No.: PCT/US2015/039504
§ 371 (c)(1),
(2) Date: Jan. 5, 2017

(87) PCT Pub. No.: WO2016/007593
PCT Pub. Date: Jan. 14, 2016

(65) Prior Publication Data
US 2017/0204282 A1    Jul. 20, 2017

Related U.S. Application Data

(60) Provisional application No. 62/023,247, filed on Jul. 11, 2014.

(51) Int. Cl.
| | |
|---|---|
| *C09D 11/10* | (2014.01) |
| *C09D 11/101* | (2014.01) |
| *B41J 2/435* | (2006.01) |
| *C09D 11/30* | (2014.01) |
| *B41J 11/00* | (2006.01) |
| *C09D 11/107* | (2014.01) |
| *C09D 11/322* | (2014.01) |
| *C09D 11/38* | (2014.01) |
| *C09D 4/06* | (2006.01) |
| *C08F 283/00* | (2006.01) |

(52) U.S. Cl.
CPC ............ *C09D 11/101* (2013.01); *B41J 2/435* (2013.01); *B41J 11/002* (2013.01); *C08F 283/008* (2013.01); *C09D 4/06* (2013.01); *C09D 11/107* (2013.01); *C09D 11/30* (2013.01); *C09D 11/322* (2013.01); *C09D 11/38* (2013.01)

(58) Field of Classification Search
CPC ..... C09D 11/101; C09D 11/00; C09D 11/107; C09D 11/38; C09D 11/103; C09D 11/322; C09D 4/106; C08F 382/008; B41J 11/00; B41J 2/435
USPC .......................................................... 523/160
See application file for complete search history.

(56) References Cited

U.S. PATENT DOCUMENTS

| | | | |
|---|---|---|---|
| 8,192,804 B2 * | 6/2012 | Fukumoto | ............ B41M 5/0023 427/511 |
| 2008/0214694 A1 | 9/2008 | Yokota | |
| 2011/0205291 A1 * | 8/2011 | Yasuda | ................ C09D 11/101 347/21 |
| 2013/0044167 A1 | 2/2013 | Hoogmartens | |

FOREIGN PATENT DOCUMENTS

| | | |
|---|---|---|
| CN | 102 719 143 B | 4/2014 |
| JP | 2008 280383 A | 9/2008 |
| JP | 2012 158638 A | 8/2012 |
| WO | 2013/019821 A1 | 2/2013 |
| WO | 2013/175416 A1 | 11/2013 |
| WO | 2014/126720 A1 | 8/2014 |

OTHER PUBLICATIONS

Supplementary Search Report issued in European Counterpart Application 15 81 8143 dated Jan. 9, 2018.
PCT International Search Report issued in PCT/US2015/39504 dated Oct. 28, 2015.
Written Opinion of the International Searching Authority issued in PCT/US2015/39504 dated Oct. 28, 2015.
International Preliminary Report issued in PCT/US2015/039504, dated Jan. 17, 2017.

* cited by examiner

*Primary Examiner* — Sanza L. McClendon
(74) *Attorney, Agent, or Firm* — Charles C. Achkar; Ostrolenk Faber LLP.

(57) ABSTRACT

The present invention provides radiation-curable (UV-curable) inks and coatings for inkjet printing comprising an inert thermoplastic acrylic resin and multifunctional monomers. The inks and coatings can be applied in a single pass printing operation. Furthermore, the inks and coatings are suitable for the printing of food, pharmaceutical and other sensitive packaging materials, particularly of plastic materials. The acrylic polymer (or copolymer) preferably has a molecular weight of 10,000 g/mole, or less, and the ink comprises less than 5 wt % of any blend of monofunctional monomer. The inks and coatings of the invention are particularly suitable for curing by UV-LED radiation.

16 Claims, No Drawings

RADIATION-CURABLE INKJET INKS AND COATINGS

CROSS REFERENCE TO RELATED APPLICATIONS

The present application is a § 371 National Phase application based on PCT/US2015/039504 filed Jul. 8, 2015, which claims the benefit of U.S. Provisional Application No. 62/023,247, filed Jul. 11, 2014, the subject matter of each of which is incorporated by reference in their entirety.

FIELD OF THE INVENTION

The present invention relates to radiation-curable inkjet inks and coatings. The inks and coatings are curable by any form of radiation, such as ultraviolet (UV) or electron beam. The inks and coatings exhibit good adhesion to substrates, such as flexible plastic substrates, when cured by UV-LED radiation.

BACKGROUND OF THE INVENTION

Radiation-curable printing inks and coatings are increasingly becoming more popular. Water-based and solvent-based inks and coatings often require application of heat to dry. This limits the types of substrates that can be used. In addition, solvent-based inks often have undesirable properties such as unpleasant odors due to the volatility of the solvents.

The printing of flexible substrates is a rapidly growing market. Flexible substrates are useful for labels, and flexible films and foils for various packages. These packages may include packaging for food or pharmaceuticals, for example. Inkjet printing offers several advantages over other types of printing when using flexible substrates.

The market for the UV-inkjet printing of flexible substrates is now growing rapidly, especially for the printing of labels. An area which is now being addressed is the printing of labels and flexible films and foils for the food packaging sector. The use of single pass printing is becoming more common. Single pass printing can be defined as where the printhead array remains in a fixed position and the image printing is completed in a single pass while the material to be printed is passed underneath, or in front of, the printhead array. Single pass inkjet printing lends itself to high throughput printing applications such as the printing of reel-fed labels, flexible packaging, and the rapid printing of 3-dimensional objects such as plastic bottles.

A market area likely to develop and expand rapidly in the future is the single pass direct printing of rigid packaging, such as poly(ethylene) terephthalate (PET) drink bottles. At the moment, the rigid packaging (bottle) sector is mostly met by the application of preprinted labels and sleeves. The direct digital inkjet printing of bottles will thus remove the need for preprinted labels, leading to material savings and new design opportunities for this market. It is likely that for digital printing, inkjet will better lend itself to this market sector than other digital technologies, such as liquid toners (e.g. HP's 'Indigo' 'Electroink' process) and Landa's Nanography process, which both rely on an offset process whereby the image is applied to a heated offset roller prior to application to the substrate. These printing technologies require that the substrate pass between an impression and a blanket roller carrying the reverse print image.

In single pass applications, a UV-LED lamp source may be used immediately after a printing station to 'pin' the ink prior to any further printing operations. Further UV-curing at the end of the single pass operation can be used to deliver the desired full cure of the printed ink layer. 'Pinning' of an ink can be defined as where relatively low intensity UV-LED lamps are used to partially, or more fully, cure the inks very soon after application, thereby reducing the risk of droplets spreading on the printed substrate. Spreading of ink droplets on the substrate could lead to undesirable dot gain and result in loss of print quality.

The UV radiation necessary for curing can be provided from several sources, including mercury arc lamps and UV-light emitting diodes (UV-LED). Because of the lower consumption of energy, and reduced heating of the substrate, UV-LED curing is often preferable to use of other sources such as mercury arc lamps. The UV-LED bulbs do not generate ozone, in contrast to the typical UV-bulbs, require less energy, and exhibit a longer lifetime. Moreover, an additional advantage for UV-LED systems over the currently used UV-bulbs and UV-energy saving bulbs is the absence of mercury in the bulb. Therefore, UV-LED's are regarded as a "green" solution over typical mercury containing UV-bulbs.

However, despite the attractiveness of UV-LED curing, there are difficulties associated with using the low energy UV-LED curing. For example, it is often difficult to obtain good adhesion to the substrate. This may be due to inefficient curing of the ink or coating. Inks and coatings are often formulated in an effort to overcome problems such as poor adhesion to the substrate. For example, inks and coatings have been formulated which contain high concentrations of monofunctional monomers. It is known that monofunctional monomers promote good adhesion to substrates, including flexible substrates. However, the inclusion of such high concentrations of monofunctional monomers would most probably make them unsuitable for those applications requiring low migration from the cured inks. Migration can be defined as the diffusion of low molecular weight components from a printed ink to cause contamination issues. Where the printed substrate forms part of a package for food, for example, these low molecular weight components could diffuse into the foodstuff itself, causing undesirable and potentially health threatening contamination of the food. The use of high concentrations of monofunctional monomers in a UV-curable inkjet product is a common practice to achieve the required adhesion, but such monomers are less likely to be reacted into the UV-cured ink network compared with multifunctional monomers, and thus substantial quantities of uncured monofunctional monomer will remain in the cured ink and be free to migrate from the ink, causing undesired contamination.

Other methods of improving adhesion that have been tried are, for example, including various additives such as surfactants in the formulations, and applying primer layers to the substrate to be printed. The use of primers, although a technically feasible approach to achieving improved adhesion of UV-cured inkjet inks to plastic surfaces, is undesirable since it introduces a further step into any printing operation.

U.S. Pat. No. 8,759,412 describes how polymerizable photoinitiators containing thioxanthone moieties can be used for the UV-LED curing of coatings and inks. The polymerizable groups on the photoinitiator will react into the ink, thereby reducing its likelihood of migrating from a cured coating/ink film. WO2014032968 describes the incorporation of thiols into a UV-curable ink to improve its cure response. However, compositions comprising thiols often have poor long-term stability, which is likely due in part to the capacity of thiols to react with acrylates via the 'Michael' reaction. JP2009249562 uses the Michael reaction ability of polyfunctional thiols to form dendritic polymers with molar excesses of multifunctional acrylate monomers. The products of such reactions enable high adhesion strength on PET (poly(ethylene terephthalate)).

EP2671722 describes UV-curable inkjet products comprising greater than 5 wt % of a (meth)acrylated silicone surfactant to deliver improved adhesion to plastic substrates when tested using the tape adhesion test. It is quite likely that some of the observed improvement achieved with the inclusion of such reactive silicones was a result of the reduced adhesive strength between the adhesive tape and the ink surface, resulting in a reduced force applied through the ink layer to the underlying substrate.

WO2002/085638 and US2012/0058317 describe the use of primer layers applied to the substrate prior to printing to achieve improved adhesion. In WO2002/085638 solvent-based or water-based primers comprising acrylic or polyurethane resins are disclosed. US2012/0058317 discloses a UV-curable primer containing a polyester acrylate along with a high concentration of an acrylated amine.

Including low molecular weight acrylic resins into UV-curable inkjet inks has been described, but generally these formulations require the incorporation of significant quantities of monofunctional monomers, such as vinyl caprolactam, phenoxyethyl acrylate, cyclic trimethylolpropane (TMP) formal acrylate and isobornyl acrylate. As described above, a high concentration of monofunctional monomers can lead to problems with migration, particularly with flexible packaging. WO2008/004002 (Sericol) demonstrates inkjet inks based solely on monofunctional monomers and does not show how adhesion can be achieved with inks based solely or largely on multifunctional monomers. WO2008/004002 describes that the inks should be substantially free of multifunctional monomers, where preferably less than 15 wt % and most preferably less than 2 wt % of the total ink composition comprises multifunctional monomers. In addition, this patent states that it is most preferable that the passive thermoplastic resin (the inert acrylic resin) should form less than 8 wt % of the total ink composition. Furthermore, none of the examples show how to achieve concentrations of more than 10 wt % of an inert acrylic resin in the ink composition. EP2666832 (HP) clearly states the need to include a monofunctional monomer to achieve the desired adhesion to plastic surfaces. Indeed, the comparative examples of this patent show that inks based solely on multifunctional monomers have both poor adhesion and too high viscosity. U.S. Pat. No. 7,662,224 (D. D. Sloan) describes the inclusion of inert acrylic resins into UV-curable inkjet fluids, although the inks also contain an organic solvent diluent.

There remains a need to develop inks and coatings suitable for inkjet printing that can be cured using UV-LED light. Preferably, this would be done without the use of components that are likely to migrate from the cured ink or coating and contaminate, for example, food or pharmaceuticals in packaging on which the ink or coating is applied.

SUMMARY OF THE INVENTION

The present invention provides radiation-curable inkjet inks and coatings. The inks and coatings are particularly suitable for curing by UV-LED radiation. The inclusion of low molecular weight acrylic polymers into the compositions can enhance the cure response of UV-curable inkjet inks and coatings, especially under the action of the emissions from UV-LED lamps. The cure response is further enhanced by inclusion of at least one multifunctional hybrid monomer, containing more than one type of functional group, such as, for example both a (meth)acrylate and a vinyl ether group. With the enhanced cure, adhesion to substrates, such as flexible plastic substrates, is also improved.

In a particular aspect, the present invention provides a radiation-curable inkjet ink or coating composition comprising:
   a) one or more acrylic polymers in an amount of greater than 5.0 wt % based on the total weight of the ink or coating; and
   b) one or more multifunctional monomers having two or more polymerizable groups per molecule;
wherein at least one multifunctional monomer is a hybrid monomer containing two or more different polymerizable groups per molecule.

The present invention also provides a printed article comprising the radiation-curable inkjet ink or coating composition as described above.

In a certain aspect, the present invention provides a method of printing, comprising:
   a) applying the ink or coating composition as described above onto a substrate; and
   b) curing the ink or coating applied to the substrate.

The inks and coatings of the invention show an improved UV-LED cure response. The improved UV-LED cure response is a particularly useful feature for an inkjet ink or coating composition intended for application via single pass operation, especially for the printing of plastic films, including packaging materials. The inclusion of low molecular weight acrylic polymers enhances the adhesion to plastic surfaces. The cure rate can be enhanced even further by including a hybrid multifunctional monomer in the inks and coatings. Another advantage of the present invention is that the inks and coatings can be used in packaging applications where low migration potential is required.

DETAILED DESCRIPTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth)acrylic acid" include both acrylate and methacrylate compounds, and both acrylic acid and methacrylic acid.

As used herein, "monofunctional" means having one functional group.

As used herein, "multifunctional" means having two or more functional groups. A multifunctional monomer, for e.g., can be a di-functional, tri-functional, tetra-functional or have a higher number of functional groups. The two or more functional groups can be the same or different.

As used herein, the terms "monomer" or "monomers" is intended to include both monomers and oligomers, or mixtures thereof.

As used herein, the terms "(meth)acrylic resin," "acrylic polymer," and "acrylic resin" are used interchangeably. These terms encompass acrylic and methacrylic polymers, copolymers, and resins.

As used herein, the terms "polymer" and "polymers" includes copolymers unless indicated otherwise.

As used herein, the terms "inks and coatings," "inks," "compositions" and "fluids" are used interchangeably.

Throughout this disclosure, all parts and percentages are by weight (wt % or mass % based on the total weight) and all temperatures are in ° C. unless otherwise indicated.

Inkjet Inks and Coatings

The present invention provides free radically polymerizable, low migration potential, UV-curable inkjet inks and coatings comprising multifunctional monomers and inert acrylic polymers (and copolymers). These inks and coatings have enhanced cure responses under the action of the light emitted by UV-LED lamps and are suitable for single pass (inkjet) processes. Furthermore, they provide excellent adhesion to plastic substrates and can be used for sensitive applications requiring low migration from the cured ink and coating films, such as food and pharmaceutical packaging. The inks and coatings are suitable for the printing of both flexible and rigid plastic packaging. Flexible packaging substrates include self-adhesive labels, plastic films including polyester, nylon, poly(ethylene), poly(propylene), and cellulose and aluminum foils. The inks and coatings are also suitable for the printing of flexible plastic films that will be formed into heat-shrinkable sleeves for bottles and other 3-dimensional containers. For flexible packaging, the inks and coatings may be applied as a surface print or as a reverse print (for ensuing lamination). The inks and coatings of the present invention are particularly suited to the direct printing of rigid packaging articles, and especially plastic bottles. Thus, the inks and coatings of the present invention can be applied to PET (poly(ethylene terephthalate)) and other polyesters, LDPE (low density poly(ethylene)), HDPE (high density poly(ethylene)), LLDPE (linear low density poly(ethylene)), PP (poly(propylene)), nylon, and any other type of plastic bottle or other rigid plastic container. The bottle, or container, may be of any shape so long as any printing operation is able to apply the inkjet inks and coatings of the invention in a suitable fashion to the surface of the container. The inks and coatings of the current invention may also be printed onto glass, ceramic and metal containers.

It has been surprisingly found that the inclusion of low molecular weight acrylic polymers into UV-curable inkjet compositions results in a very marked improvement to their cure response, especially under the action of the output from UV-LED light sources. Although the inventors do not wish to be bound to any particular theory for this improvement, they postulate that this may be the result of a chain transfer effect induced by the acrylic polymer, which helps to overcome the effects of oxygen inhibition. Oxygen inhibition is recognized as being a severe issue for UV-curable (free radical) inkjet compositions and its effect is particularly pronounced when the initiating radical flux is low, as would be the case encountered with the lower intensity UV-LED light sources (as compared with the more conventional medium pressure mercury UV lamps).

Thus, the introduction of low molecular weight acrylic polymers (or copolymers) into UV-curable inkjet compositions, by way of solution, results in significant and highly surprising improvements to their cure response, especially of that to UV-LED light. There is no particular limit on what acrylic polymer might be used but it is preferable that the molecular weight of any such polymer is comparatively low, with molecular weights of 20,000 g/mole or less, and preferably of 10,000 g/mole or less.

A key advantage achieved by the present invention is that by the correct choice of multifunctional monomer, or blend, it is possible to achieve inkjet compositions at acceptable viscosity having concentrations of acrylic polymer of greater than 10 wt %. These high concentrations of acrylic polymer help enable the adhesion of such ink compositions to plastic substrates, wherein the ink contains very low concentrations, or is devoid of, monofunctional monomer. Particularly useful multifunctional monomers are 'hybrid' types containing both (meth)acrylate and vinyl ether polymerizable groups in the monomer molecule. An especially useful monomer is 2-(2-vinyloxyethoxy)ethyl acrylate (VEEA), although other hybrid monomers such as those described in U.S. Pat. No. 6,310,115 and US2003/0199655 would also be suitable. It is the combination of these two components, the acrylic polymer and hybrid monomer, which delivers the surprising adhesion performance. By themselves, neither can provide an ink with acceptable adhesion to plastic substrates, particularly rigid plastic substrates (e.g. PET bottles).

The inks of the present invention are particularly suitable for inkjet printing via single pass operation, and especially for the printing of non-absorbent plastic substrates. Not only is the adhesion of these inks to plastic substrates highly advantageous, but their ability to be 'pinned' under the action of the output from UV-LED light sources is also highly desirable. The ability of inks and coatings according to the present invention to 'pin' under the action of the output from UV-LED sources leads to the reduced risk of the ink droplets spreading after application. Spreading of droplets after application leads to image quality problems as a result of 'dot gain'. Furthermore, successful UV-LED pinning of compositions prepared according to the present invention will also reduce the risk of inks 'bleeding' into improperly pinned previously applied ink layers. This can be a problem where pigmented inks are applied over a backing white ink, for example. If the white ink is poorly pinned (or cured), prior to the printing of subsequent colors, then the subsequent inks can blend into the poorly cured white ink layer resulting in what appears as a 'washed out' print.

Thus, in a certain aspect, the present invention provides a radiation-curable inkjet ink or coating composition comprising:
  a) one or more acrylic polymers in an amount of greater than 5.0 wt % based on the total weight of the ink or coating; and
  b) one or more multifunctional monomers having two or more polymerizable groups per molecule;
wherein at least one multifunctional monomer is a hybrid monomer containing two or more different polymerizable groups per molecule.

Compositions prepared according to the present invention have polymerizable components (the monomers and oligomers that are used in the preparation of the inks) which are predominantly multifunctional. A multifunctional monomer (or oligomer) can be defined as one which contains within its molecular structure two (2) or more polymerizable groups, which may be the same or different. For UV-curable, free-radically polymerizable, inkjet products these polymerizable groups are usually (meth)acrylate. However, an aspect of this invention shows that multifunctional monomers comprising both (meth)acrylate and vinyl ether groups (a 'hybrid' monomer) can lead to improved adhesion in compositions comprising inert (thermoplastic) acrylic resins. Indeed, it is the bringing together of these two components that leads to the improved adhesion to plastic substrates. Either component by itself in an ink, where the polymerizable component consists predominantly of multifunctional monomers, does not bring about the desired adhesion to plastic substrates. A further advantage of using a hybrid monomer, such as VEEA, is that its low viscosity enables the incorporation of significant concentrations of the inert thermoplastic acrylic resin. Indeed, with compositions prepared according to the current invention it is possible to achieve inks having acceptable printing viscosities with concentrations of acrylic resin of 10 wt % or greater of the total ink composition.

A further, and most surprising, advantage of inks and coatings prepared according to the present invention is that they have enhanced cure response under the action of UV-LED lamp sources. This attribute makes these inks and coatings suitable for inkjet compositions intended for the single pass market. The reason for this feature being especially advantageous for UV-curable inkjet inks and coatings is that it is common for UV-LED lamps to be sited immediately after a color printing station to 'pin' the ink prior to further printing operations, and other operations further along the processing operation, which often includes a final UV-curing station used to achieve the desired full cure of the inks. 'Pinning' of an ink can be defined as where relatively low intensity UV-LED lamps are used to partially cure the inks after application, thereby reducing the risk of droplets spreading on the printed substrate which could lead to undesirable dot gain and hence loss of print quality. Since inkjet inks and coatings are of low viscosity, when they are applied to non-absorbent surfaces, such as plastics, they tend to flow quite readily. For 100% UV-curable inkjet inks and coatings (i.e. those inks containing no diluent) inks can be applied with film thicknesses greater than 5 µm. These relatively high wet film thicknesses coupled with the low viscosity of inkjet inks and coatings can result in the inks rapidly spreading on the substrate after printing, resulting in an observable blurring of the print image. This problem of 'dot gain' is especially evident when fine text is printed; without adequate pinning of inks the text can become illegible due to the ink spreading on the substrate. A further issue with inks which are poorly pinned relates to the application of a 'backing' white prior to the printing of any other colors. If the white is not cured, or poorly pinned, prior to the printing of any other color, then the subsequent inks can leach into the white, since it is still fluid, resulting in print of noticeably weaker color strength.

The enhancement that the inclusion of these low molecular weight acrylic resins bring to the UV-LED cure response of a UV-curable inkjet ink is significant. This enhancement is advantageous as it leads to inks which are more easily 'pinned' by the action of UV-LED lamps, without having to use increased concentrations of photoinitiators having absorbances tuned to the output from a UV-LED light source. It should be noted, however, that the inclusion of low concentrations of specific photoinitiators having absorbances matched to the output from UV-LED sources can lead to even further enhancement of the cure response under the action of UV-LED sources. One of the key UV-LED emissions is at 395 nm, and it has been found that when such a light source is used, the use of thioxanthone type photoinitiators having low migration potential are especially useful (see, for example, those described in U.S. Pat. Nos. 7,354, 957, 8,759,412 and EP1616921). This improved 'pinning' performance of inks prepared according to the present invention reduces the risk of droplets spreading on the printed substrate, and therefore ameliorates undesirable dot gain and loss of print quality prior to final curing of the printed substrate.

The inks and coatings of the invention have an enhanced capacity to 'pin' under the action of interstation UV-LED lamps. In single pass operations, and particularly for the printing of non-absorbent substrates (e.g. plastics) it is becoming more common to have UV-LED lamps situated between inkjet printing stations, especially after the white and before the printing of other colors. UV-LED lamps may then be situated after each of the succeeding color stations or there may be a UV-LED lamp after application of all the colors. After the inks have been 'pinned' it is then common to have a final UV-curing station which could be composed of any combination of UV light emitting lamps, whether UV-LED or medium pressure mercury lamps or indeed any combination of lamps emitting in the UV region.

The ability of inks and coatings of the invention to cure satisfactorily, with acceptable light doses, under the action of UV-LED light sources alone is particularly advantageous. Although this could be a useful feature for the single pass market, it would also make the inks of the invention suitable for the multi-pass graphics inkjet market where presses utilizing UV-LED light sources are becoming more common.

The use of multifunctional monomers, along with the correct choice of photoinitiators, enables compositions according to the current invention to be used in applications requiring low migration, i.e. when the inks of the current invention are cured under the action of actinic radiation they have very low levels of unbound material which could otherwise diffuse (or migrate) from the cured ink film into its surrounding environment and hence cause potential contamination issues. When the inventors have prepared inks similar to those previously described, where the polymerizable component was a blend of phenoxyethyl acrylate (PHEA) and vinyl-caprolactam (V-CAP), and 10% of an inert acrylic was dissolved into the ink, the resultant ink cured to produce printed ink films having a very strong odor and very high levels of unreacted monomer. In particular, the amount of unreacted V-CAP in the cured ink film was especially high. V-CAP is widely recognized as having high solvency power and the high level of unreacted V-CAP remaining in a cured ink film might help to solvate the plastic surface after the printing and curing of any ink thereby leading to some of the good adhesion that is associated with this monomer. It is interesting to note that it is a quite common observation with V-CAP containing inks that the adhesion can improve with time after the application and curing of the ink. However, the poor conversion of monofunctional monomers, and V-CAP in particular, makes such inks unsuitable for those applications requiring low migration.

A further, and most important, aspect of the invention is that the predominant use of multifunctional monomers as the polymerizable component allows these inks to be used in applications where low migration from the cured ink film is required. Such applications include the printing of food packaging and pharmaceutical packaging materials, and of objects that could come into regular human (and animal) contact, such as toys, household objects, etc. Clearly, inkjet compositions comprising significant quantities of monofunctional monomers and especially of N-vinylcaprolactam (NVC), are unsuited to such applications due to the significant quantities of unreacted monomer which remain in cured ink films, which could then be available to diffuse or migrate out of the cured ink into its surrounding environment, thus causing unwanted contamination and potential hazards to health. By using multifunctional monomers, the likelihood of such monomers reacting into the cured ink via any of its polymerizable groups, and therefore not being free to migrate, is considerably greater than is the case with monofunctional monomers.

Not only do the inks and coatings of the invention provide the necessary adhesion to the substrates, but, due to the predominant use of multifunctional monomers, they have the necessary low migration potential needed to ensure that any contamination of the packaged product is minimized. Indeed, inks prepared according to the present invention, after being cured under the action of a UV-light source, have been demonstrated to have very low levels of low molecular weight species (monomers and photoiniators) which can diffuse from the cured film. In tests conducted in the laboratories of the inventors, migration levels below the equivalent of 10 ppb (10 μg(contaminant)/1 kg(packaged product)) have been achieved. This is not possible with inks prepared according to earlier descriptions of inclusion of inert acrylic resins into inkjet fluids comprising significant quantities of monofunctional monomers.

For UV-curable inks or coatings it is generally necessary to include photoinitiators in the composition which produce the initiating species under the action of UV-light. Where these ink and coating compositions are applied to substrates (e.g. labels, plastic films, cartonboard) which will then form part of structures used to form packaging for products such as foodstuffs, health and pharmaceutical products, then the photoinitiators used should preferably have low migration potential and be those recognized as being suitable for such sensitive applications, as for example detailed in EUPIA's "Guideline on Printing Inks applied to the non-food contact surface of food packaging materials and articles." Although there is no particular restriction on what photoinitiator or blend of photoinitiators can be used, it has been found that polymeric thioxanthone photoinitiators are particularly useful. For compositions of the invention, and for the single pass inkjet market, a particularly favored photoinitiator is Omnipol TX, which can further aid the pinning characteristic of these inks under the action of a UV-LED light source.

Omnipol TX (from IGM Resins) is a multifunctional polymeric thioxanthone photoinitiator. This photoinitiator is especially effective in compositions of the present invention for the output from UV-LED sources emitting their radiation at 395 nm. This is due to the photoinitiator having an absorption maximum that coincides with the 395 nm output from such UV-LED lamps.

For both the improved adhesion performance to plastic substrates and the enhanced cure response under the action of the output from UV-LED light sources of compositions according to the current invention, it is the surprising combination of the correct multifunctional monomer along with an inert (thermoplastic) acrylic resin that achieves both. Considering the prior art, it is most surprising that an inkjet fluid can achieve adhesion to plastic surfaces when its polymerizable component comprises largely or entirely of multifunctional monomers. Indeed, some of the examples contained within the prior art would indicate that inks rich in multifunctional monomers have very poor adhesion performance. Furthermore, it is interesting to note that the (inkjet) examples containing acrylic resins, described in the prior art, and providing adhesion to plastic substrates, all comprise significant concentrations of monofunctional monomers, and in particular they contain N-vinylcaprolactam (NVC) as a part of the monofunctional monomer blend. NVC is widely recognized for its ability to improve the adhesion of inkjet fluids to plastic surfaces, especially in the wide format multipass graphics (inkjet) market. It is further interesting to note that experiments conducted in the laboratories of the inventors where inks that were prepared as described in the prior art, when cured, had high concentrations of residual, uncured, NVC remaining in the ink film. A common observation with UV-curable inkjet inks and coatings comprising NVC is that their adhesion to plastic films can improve with time after they have been UV-cured. It is conceivable that this adhesion improvement is related to the high concentrations of residual NVC monomer residing in the ink film that can then continue to solvate the underlying plastic substrate leading to a consequent improvement in adhesion. NVC, in its own right, is a relatively strong solvent (with a Fedors solubility parameter ($\delta 1$) of 12.1 Cal/cm (WO1998021287)), more so than other monomers such as octadecyl acrylate ($\delta 1$=8.99), iso-bornyl acrylate ($\delta 1$=9.71), and phenoxyethyl acrylate ($\delta 1$=11.03). Thus, it is most surprising that an inkjet composition according to the present invention based on multifunctional monomers and acrylic resins, which when UV-cured has very low levels of residual uncured monomer, achieves excellent adhesion to plastic substrates.

For inks applied to the non-food contact surface of flexible packaging (i.e. the outer surface), whether that be to the primary packaging or secondary packaging (labels and sleeves), then the most likely route for migratable species from the ink contaminating the foodstuff is by what is known as set-off migration. This is where printed matter is stacked or reeled prior to it being filled with food. Thus, the ink comes into contact with what will be the food-contact surface of the package and migratable components of the ink can diffuse into this surface. When the package is then filled with foodstuff the contaminants from the ink which have diffused into the contact-surface of the package can then leach into the food, causing a potential contamination issue. For the situation where the inks are applied to the outer surfaces of rigid packaging objects, such as drink bottles, then the most probable route to the contamination of the foodstuff is via penetration migration (sometimes referred to as through migration). Thus, any UV-curable inkjet fluid which is applied to either the primary or secondary packaging of foodstuff should not result in contamination of that foodstuff at levels exceeding regulatory limits.

Any type of suitable photoinitiators can be used, including, but not limited to, thioxanthones, phosphine oxide compounds, alpha-hydroxy ketones, benzophenones, aminobenzoates, alpha-aminoalkylphenones, benzoin ethers and benzyl ketals. Any blend of photoinitiators may be used in the compositions of this invention, and include, but are not limited to, those types able to generate free radicals on irradiation such as benzophenone, 1-hydroxycyclohexyl phenyl ketone, 2-benzyl-2-dimethylamino-(4-morpholinophenyl)butan-1-one, diphenyl-(2,4,6-trimethylbenzoyl) phosphine oxide, phenyl bis(2,4,6-trimethylbenzoyl)phosphine oxide, isopropylthioxanthone, diethylthioxanthone, and diester of 2-carboxymethoxy thioxanthone and poly tetramethyleneglycol 250. However, as mentioned previously, those photoinitiators having recognized low migration potential and suitable for use in inks intended for the printing of the non-contact surface of food packaging are especially preferred. Amine synergists may also be used, such as acrylated amines, ethyl-4-dimethylaminobenzoates, 2-ethylhexyl-4-dimethylamino benzoate and low migration derivatives thereof.

It is preferred that the inks and coatings of the present invention contain greater than or equal to 40 wt % polymerizable components (monomers and oligomers) (referred to collectively as "polymerizable component"), based on the total weight of the ink or coating composition. Preferably, the inks and coatings contain greater than or equal to 50 wt %; or 55 wt %; or 60 wt %; or 70 wt % of polymerizable components based on the total weight of the ink or coating composition.

It is preferred that the polymerizable component of these inks should contain greater than 90% of any blend of multifunctional monomers, more preferably greater than 95%, even more preferably greater than 97.5% of multifunctional monomers, and most preferably should be essentially free of any monofunctional monomer. Examples of suitable multifunctional ethylenically unsaturated monomers include but are not limited to the following: 1,3-butylene glycol dimethacrylate; 1,4-butanediol dimethacrylate; 1,6 hexanediol diacrylate; 1,6 hexanediol dimethacrylate; alkoxylated diacrylate; diethylene glycol dimethacrylate; dipropylene glycol diacrylate; ethoxylated (10) bisphenol a diacrylate; ethoxylated (2) bisphenol a dimethacrylate; ethoxylated (3) bisphenol a diacrylate; ethoxylated (3) bisphenol a dimethacrylate; ethoxylated (4) bisphenol a diacrylate; ethoxylated (4) bisphenol a dimethacrylate; ethoxylated bisphenol a dimethacrylate; ethoxylated (10) bisphenol dimethacrylate; ethylene glycol dimethacrylate; polyethylene glycol (200) diacrylate; polyethylene glycol (400) diacrylate; polyethylene glycol (400) dimethacrylate; polyethylene glycol (400) dimethacrylate; polyethylene glycol (600) diacrylate; polyethylene glycol (600) dimethacrylate; polyethylene glycol 400 diacrylate; propoxylated (2) neopentyl glycol diacrylate; tetraethylene glycol diacrylate; tetraethylene glycol dimethacrylate; tricyclodecane dimethanol diacrylate; tricyclodecanedimethanol dimethacrylate; triethylene glycol diacrylate; triethylene glycol dimethacrylate; tripropylene glycol diacrylate; ethoxylated (15) trimethylolpropane triacrylate; ethoxylated (3) trimethylolpropane triacrylate; ethoxylated (6) trimethylolpropane triacrylate; ethoxylated (9) trimethylolpropane triacrylate; ethoxylated 5 pentaerythritol triacrylate; ethoxylated (20) trimethylolpropane triacrylate; propoxylated (3) glyceryl triacrylate; trimethylolpropane triacrylate; propoxylated (5.5) glyceryl triacrylate; pentaerythritol triacrylate; propoxylated (3) glyceryl triacrylate; propoxylated (3) trimethylolpropane triacrylate; trimethylolpropane triacrylate; trimethylolpropane trimethacrylate; tris (2-hydroxy ethyl) isocyanurate triacrylate; di-trimethylolpropane tetraacrylate; dipentaerythritol pentaacrylate; ethoxylated (4) pentaerythritol tetraacrylate; pentaerythritol tetraacrylate; dipentaerythritol hexaacrylate; combinations thereof; and the like.

It should be recognized by those skilled in the art that difunctional monomers, such as hexanediol diacrylate, PEG diacrylates, etc. will be formed predominantly of the difunctional adduct. However, it is the case that a small part of these products may contain a minor component of the monofunctional adduct. For the purposes of this invention all these difunctional monomers should be regarded as having 2 polymerisable groups and hence multifunctional, thereby fulfilling the requirements of the invention.

Preferred multifunctional monomers are hybrid monomers containing two or more different polymerizable groups per molecule. Particularly preferred multifunctional monomers are hybrid types containing both (meth)acrylate and vinyl ether polymerizable groups in the monomer molecule. An especially useful monomer is VEEA, although other hybrid monomers such as those described in U.S. Pat. No. 6,310,115 and US2003/0199655 would also be suitable. The inks and coatings of the invention comprise greater than 12 wt % of one or more hybrid multifunctional monomers, based on the total weight of multifunctional monomers. Preferably, the inks and coatings of the invention comprise greater than 25 wt %; or greater than 30 wt %; or greater than 35 wt %; or greater than 40 wt % of one or more hybrid multifunctional monomers, based on the total weight of multifunctional monomers. Preferably, the inks and coatings of the invention contain greater than 50 wt %; or greater than 70 wt %; or greater than 90 wt %; or greater than 99 wt % of one or more hybrid multifunctional monomers, based on the total weight of multifunctional monomers. The inks or coatings of the invention may contain about 100 wt % of one or more hybrid multifunctional monomers, based on the total weight of multifunctional monomers. Preferably, at least one hybrid multifunctional monomer contains both (meth)acrylate groups and vinyl ether groups.

The compositions comprise an acrylic polymer or copolymer which is dissolved into the ink. Such acrylic polymers are usually prepared by the (thermal) free radical polymerization of blends of monomers including, but not limited to, acrylic acid, methacrylic acid, styrene, butyl (meth)acrylate, ethyl (meth)acrylate, methyl (meth)acrylate, or isobutyl (meth)acrylate, acrylonitrile, (meth)acrylamide, isopropylacrylamide, N-isobutylacrylamide, itaconic acid, hexyl acrylate, octyl acrylate, 2-hydroxyethoxy acrylate, 2-ethylhexyl acrylate, dodecyl acrylate and higher alkyl (meth) acrylates and their isomers thereof, isobornyl (meth)acrylate, alpha-methyl styrene, vinyl acetate and other vinyl esters, 2-(dimethylamino)ethyl (meth)acrylate, poly(ethylene glycol) monoacrylate, poly(propylene glycol) monoacrylate, poly(caprolactone) acrylate, and the like. The acrylic polymer has an average molecular weight of preferably less than 20,000 g/mole, and more preferably less than 10,000 g/mole. The molecular weight of such polymers can be measured by those techniques known in the art, such as gel permeation chromatography. Examples of acrylic polymers include those supplied from Dianal, Elvacite, Rohm and Haas, and DSM, amongst others. The acrylic polymer is preferably present in the compositions at a concentration of between 2 and 20 wt %, more preferably between 5 and 20 wt % and most preferably between 8 and 15 wt %.

Advantageously, the inks and coatings of the present invention contain less than 10 wt % of monofunctional monomers. Preferably, the inks and coatings of the present invention contain less than 5 wt % of monofunctional monomers.

The inks and coatings of the present invention, intended for inkjet printing, would preferably have viscosities of less than 25 mPa·s at 50° C., and more preferably less than 15 mPa·s at 50° C. However, one of skill in the art knows that viscosity may be adjusted appropriately for different types of printing, such as flexographic or rotogravure printing.

As well as the acrylic polymer, the multifunctional monomers, and photoinitiators, the inks and coatings may also contain pigments, dyes and other components which enable them to perform in their intended application. These other ink components include, but are not restricted to, stabilizers, wetting aids, slip agents, antifoams, fillers, rheological aids, etc.

EXAMPLES

The following examples illustrate specific aspects of the present invention and are not intended to limit the scope thereof in any respect and should not be so construed.

Ink Preparation

The inks were prepared by mixing the pigment dispersion with the ink components using a Silverson type disperser for 30 minutes. The inks were then filtered to remove any oversized particles that might be present in the ink. All amounts are in wt %.

Viscosity Measurements

The viscosities of the inks were measured using a Brookfield DV-II+ Pro Viscometer equipped with Spindle no. 18, at 100 rpm. Viscosity was measured in mPas·s.

Assessing the UV-LED Cure Response of the Inks

The cure response of the inks was determined by applying 12 μm thick films to Leneta opacity charts (Form 2A) using a calibrated K-Bar (from RK Print). The coated charts were then passed through a Nordson Conveyor, equipped with an Integration Technology LEDZero Solidcure lamp, emitting at 395 nm, with a nominal peak irradiance of 10 W/cm². The belt speed of the conveyor was adjusted so that the UV-dose per pass was 50 mJ/cm², as measured by a calibrated International Light Technologies ILT 400 Profiling Belt Radiometer (measuring in the BAV range; 275-485 nm). The number of passes through the rig to achieve cure was then recorded, allowing the UV-dose level to achieve cure to be determined. The cure was assessed as being the point at which the ink became tack-free to the touch.

Testing the Adhesion Performance of the Inks

The inks were applied, at 12 μm thickness, to 300 μm Melinex S (a polyester film) and a 90 μm cast polypropylene film, both of which had previously had their surfaces treated by corona discharge. The coated films were then passed through a Fusion UV Systems UV-Rig equipped with a medium pressure H-bulb. The belt speed was adjusted so that the UV-dose, as measured by a calibrated International Light Technologies ILT 490 Profiling Belt Radiometer (covering the UV-A and UV-B ranges), was 200 mJ/cm². The adhesion of the cured inks was then determined by a cross-hatch tape adhesion test (according to ASTM D 3359), and was ranked from 0 (no ink detachment) to 5 (more than 65% of the ink detached from the polyester film).

Curing the Inks for Extraction/Migration and Odor Testing

The inks were applied to 36 μm Melinex S (a polyester film) at 12 μm thickness, and then cured at 200 mJ/cm², using a Fusion UV Systems UV-Rig equipped with a medium pressure H-bulb. The belt speed was adjusted to deliver the required UV-dose of 200 mJ/cm², as measured by a calibrated International Light Technologies ILT 490 Profiling Belt Radiometer (covering the UV-A and UV-B ranges).

Assessing the Level of Extractable Monomer

The level of unbound, unreacted monomer in a print was determined by a 'total extraction' test. This test involved soaking 30 cm² of the print in 2 ml of methanol, containing 0.025 wt % of monomethyl ether hydroquinone (MEHQ; stabilizer), for 24 hours at room temperature before the methanol solution was analyzed by GC-MS. The GC-MS was calibrated with known solutions of the monomers and the results are reported as ppb, the equivalent amount of monomer that would be present in 1 kg of food according to the EU packaging model (where it is assumed that 600 cm² of substrate is required to package 1 kg of food) if all the unbound monomer in the print were to migrate into and contaminate the food.

Assessing the Level of Migratable Species

The level of contamination from a print surface was determined by a 'set-off' migration test. This test involved blocking 90 cm² of the printed surface to a 30 micron sheet of LDPE (low density poly(ethylene)), at 10 tonnes for a period of 72 hours at room temperature, and then for a further period of 10 days at 40° C. under a load of 5 kg. The poly(ethylene) film was then extracted into 2 ml of methanol, containing 0.025 wt % of MEHQ, for 24 hours before the methanol solution was analyzed by GC-MS. Similarly, the results are reported as ppb, the amount of migratable material that would be present in 1 kg of food.

Assessing the Odor of Cured Inks

For this test, five prints of each ink were prepared as described above. The coated PET films were stacked on top of each other. After 24 hours, prints from the middle of the stack were taken and assessed for odor. A score of 1 to 6 was assigned to each print, where 1 denotes insignificant odor emanating from the print, and 6 denotes a strong, unpleasant odor emanating from the print.

Example 1

Properties of Cyan Inkjet Ink Compositions Containing Acrylic Polymer

Example 1 and Example A (comparative) inks were prepared according to the formulations in Table 1. Viscosity, cure response, odor, and adhesion were assessed as described above.

TABLE 1

Formulation, viscosity, cure response, odor and adhesion of Ex. 1 and Ex. A

| Component | Example A (comparative) | Example 1 |
|---|---|---|
| VEEA | 36.0 | 36.0 |
| 3-MePDDA | 35.9 | 35.9 |
| CN3715LM | 2.5 | 2.5 |
| CN965 | 10.0 | — |
| ANUR | — | 10.0 |
| Irgacure 819 | 3.0 | 3.0 |
| KIP160 | 3.0 | 3.0 |
| TegoGlide 410 | 0.4 | 0.4 |

TABLE 1-continued

Formulation, viscosity, cure response, odor and adhesion of Ex. 1 and Ex. A

| Component | Example A (comparative) | Example 1 |
|---|---|---|
| Ethanox 703 | 0.2 | 0.2 |
| Cyan Dispersion 1 | 9.0 | 9.0 |
| Total | 100.0 | 100.0 |
| Viscosity at 50° C. (mPa·s) | 8.5 | 9.0 |
| UV-LED Cure Response (mJ/cm²) | 700 | 250 |
| Odor | 3 | 3 |
| Adhesion to 300 μm PET | 5 | 4 |

VEEA = 2-(2-vinyloxyethoxy)ethyl acrylate
3-MePDDA = 3-Methylpentanediol diacrylate
CN3715LM = An acrylated amine (from Sartomer)
CN965 = An acrylated urethane oligomer (from Sartomer)
ANUR = Acrylic Polymer (from Dianal)
Irgacure 819 = Photoinitiator (from BASF)
Esacure KIP160 = Photoinitiator (from Lamberti)
Ethanox 703 = Stabilizer (from Albemarle)
TegoGlide 410 = Slip Aid (from Evonik)
Cyan Dispersion 1 = a dispersion containing 25.0 wt % of Pigment Blue 15:4, the remainder comprising the dispersant (Efka 7476), stabilizers and NPG(PO)DA
NPG(PO)DA = Propoxylated neopentylglycol diacrylate (degree of propoxylation = 2)

Table 1 shows that an ink comprising only multifunctional monomers, and where a urethane acrylate oligomer is replaced with an inert acrylic resin, produces an ink with markedly superior cure response under the action of the light emitted from a 395 nm UV-LED lamp. A minor improvement in adhesion to the rigid polyester film was observed.

Examples 2 to 6

Cyan Inkjet Inks with Different Monomers, and Different Concentrations of Acrylic Polymer Table 2 below shows the compositions for Examples 2 to 8 and Comparative Examples B, C and D, showing how the monomer composition and the concentration of the acrylic polymer can influence the properties of inks prepared according to the invention. Viscosity, cure response, odor, and adhesion were assessed as described above.

TABLE 2

Formulation, viscosity, cure response, odor and adhesion of Ex. 2 to 6 and Ex. B to D

| Component | Ex. 2 | Ex. 3 | Ex. 4 | Ex. 5 | Ex. 6 | Ex. B | Ex. C | Ex. D |
|---|---|---|---|---|---|---|---|---|
| VEEA | 72.2 | 69.7 | 68.7 | 67.2 | 67.2 | — | — | 67.2 |
| 3-MePDDA | — | — | — | — | — | 69.7 | — | — |
| DPGDA | — | — | — | — | — | — | 69.7 | — |
| CN3715LM | 2.0 | 2.0 | 2.0 | 2.0 | 2.0 | 2.0 | 2.0 | 2.0 |
| CN965 | — | — | — | — | — | — | — | 15.0 |
| ANUR | 10.0 | 12.5 | 13.5 | 15.0 | — | 12.5 | 12.5 | — |
| DM55 | — | — | — | — | 15.0 | — | — | — |
| Irgacure 819 | 3.0 | 3.0 | 3.0 | 3.0 | 3.0 | 3.0 | 3.0 | 3.0 |
| KIP160 | 3.0 | 3.0 | 3.0 | 3.0 | 3.0 | 3.0 | 3.0 | 3.0 |
| TegoGlide 410 | 0.6 | 0.6 | 0.6 | 0.6 | 0.6 | 0.6 | 0.6 | 0.6 |
| Ethanox 703 | 0.2 | 0.2 | 0.2 | 0.2 | 0.2 | 0.2 | 0.2 | 0.2 |
| Cyan Dispersion 1 | 9.0 | 9.0 | 9.0 | 9.0 | 9.0 | 9.0 | 9.0 | 9.0 |
| Total | 100.0 | 100.0 | 100.0 | 100.0 | 100.0 | 100.0 | 100.0 | 100.0 |
| Viscosity at 50° C. (mPa·s) | 7.2 | 9.8 | 10.3 | 12.5 | 13.1 | 14.7 | 23.0 | 10.7 |
| UV-LED Cure Response (mJ/cm²) | 200 | 150 | 150 | 100-150 | 100-150 | 350 | 600 | 750 |
| Odor | 3 | 3 | 3 | 3 | 3 | 3 | 3 | 3 |
| Adhesion to 300 μm PET | 3-4 | 3 | 1 | 0 | 0 | 5 | 5 | 5 |
| Adhesion to 90 μm CPP | 5 | 5 | 5 | 4 | 1 | 5 | 5 | 5 |

DPGDA = Dipropylene Glycol Diacrylate
DM55 = Paraloid DM55 (An acrylic polymer, from Dow)

The results in Table 2 show that the inks of Examples 2 to 6, containing both an inert acrylic polymer and a hybrid monomer, have good cure response, adhesion, and low odor when cured with UV-LED radiation. Conversely, comparative Examples B, C, and D, which contain either an acrylic polymer or a hybrid monomer, but not both, exhibit inferior cure response.

Examples 7 to 10

Cyan Inkjet Inks Containing Varying Amounts of Hybrid Multifunctional Monomer

Table 3 below provides the compositions and results for Examples 7 to 10 which are inks based on Examples 3 and 4, where a portion of the VEEA is replaced with a multifunctional monomer. Viscosity, cure response, odor, and adhesion were assessed as described above.

TABLE 3

Formulation, viscosity, cure response,
odor and adhesion of Ex. 7 to 10

| Component/Test | Ex. 7 | Ex. 8 | Ex. 9 | Ex. 10 |
|---|---|---|---|---|
| VEEA | 64.7 | 60.7 | 48.7 | 49.7 |
| SR399 | 4.0 | — | — | — |
| SR9035 | — | 8.0 | — | — |
| SR341 | — | — | 20.0 | 20.0 |
| CN3715LM | 2.0 | 2.0 | 2.0 | 2.0 |
| ANUR | 13.5 | 13.5 | 13.5 | 12.5 |
| Irgacure 819 | 3.0 | 3.0 | 3.0 | 3.0 |
| KIP160 | 3.0 | 3.0 | 3.0 | 3.0 |
| TegoGlide410 | 0.6 | 0.6 | 0.6 | 0.6 |
| Ethanox 703 | 0.2 | 0.2 | 0.2 | 0.2 |
| Cyan dispersion 1 | 9.0 | 9.0 | 9.0 | 9.0 |
| Total | 100 | 100 | 100 | 100 |
| Viscosity at 50° C. (mPa · s) | 12.2 | 14.6 | 11.4 | 10.3 |
| UV-LED Cure Response (mJ/cm$^2$) | 150 | 150 | 200 | 250 |
| Odor | 3 | 3 | 2 | 2 |
| Adhesion to 300 μm PET | 2 | 1 | 1 | 4 |

SR399 = Dipentaerythritol Pentaacrylate (from Sartomer)
SR9035 = Ethoxylated TMPTA (from Sartomer)
SR341 = 3-methyl-1,5-pentanediol diacrylate (from Sartomer)

The results in Table 3 show that it is possible to replace a minor part of the VEEA component of Examples 3 and 4 without causing a drastic loss to the UV-LED cure response and adhesion of these inks. However, as mentioned previously, Comparative Example B indicates that if no VEEA is present in the ink, then both the adhesion and UV-LED cure response are very poor.

Examples 11 to 13

Cyan Inkjet Inks Containing Different Photoinitiators

Taking Example 2 as a base, Examples 11 to 13 show how the choice of photoinitiator can impact the UV-LED cure response. In these examples, the compositions were identical to Example 2, but Omnipol TX was introduced at either 1.0 or 2.0 wt % and, in the case of Example 13, the concentration of Irgacure 819 was reduced to 1.5 wt %. The concentration of Dianal ANUR was maintained at 10 wt % and adjustments for the change in photoinitiator composition were balanced by reducing the concentration of VEEA accordingly. Viscosity, cure response, odor, and adhesion were assessed as described above.

TABLE 4

Formulation, viscosity, cure response,
odor and adhesion of Ex. 2 and 11 to 13

| Component/Test | Ex. 2 | Ex. 11 | Ex. 12 | Ex. 13 |
|---|---|---|---|---|
| VEEA | 72.2 | 71.2 | 70.2 | 71.7 |
| CN3715LM | 2.0 | 2.0 | 2.0 | 2.0 |
| Dianal ANUR | 10.0 | 10.0 | 10.0 | 10.0 |
| Irgacure 819 | 3.0 | 3.0 | 3.0 | 1.5 |
| Omnipol TX | 0.0 | 1.0 | 2.0 | 2.0 |
| KIP160 | 3.0 | 3.0 | 3.0 | 3.0 |
| Tegoglide 410 | 0.6 | 0.6 | 0.6 | 0.6 |
| Ethanox 703 | 0.2 | 0.2 | 0.2 | 0.2 |
| Cyan dispersion 1 | 9.0 | 9.0 | 9.0 | 9.0 |
| Total | 100.0 | 100.0 | 100.0 | 100.0 |
| Viscosity at 50° C. (mPa · s) | 7.2 | 9.0 | 9.6 | 9.4 |
| UV-LED Cure Response (mJ/cm$^2$) | 200 | 100 | 50 | 100 |
| Odor | 3 | 2 | 2 | 3 |
| Adhesion to 300 μm PET | 3-4 | 3 | 3 | 3 |

Omnipol TX = A Polymeric Thioxanthone type Photoinitiator (from IGM Resins)

The results in Table 4 clearly show that the UV-LED cure response of these inks can be improved by optimizing the selection of photoinitiators. Omnipol TX is a particularly favored photoinitiator as it has a UV-absorption band whose maximum coincides with the 395 nm emission band of the Integration Technology LEDZero Solidcure lamp used in these experiments. It is of particular note that the belt speed of the conveyor used to achieve the dose of 50 mJ/cm$^2$ was about 35 m/min. Thus, the cure response for Example 12 is excellent and shows that compositions according to the current invention could be well suited to applications where cure via UV-LED light sources alone could be achievable (including both single pass and multipass printing operations).

Examples 14 to 18

Cyan Inkjet Inks Containing Different Acrylic Polymers and Alternative Photoinitiator Combinations Examples 14 to 18 were prepared according to the formulations in Table 5. An alternative acrylic resin (DM55) and alternative photoinitiator blends were used. Viscosity, cure response, odor, and adhesion were assessed as described above.

TABLE 5

Formulation, viscosity, cure response,
odor and adhesion of Ex. 14 to 18

| Component | Ex. 14 | Ex. 15 | Ex. 16 | Ex. 17 | Ex. 18 |
|---|---|---|---|---|---|
| VEEA | 72.2 | 70.2 | 63.1 | 62.1 | 62.85 |
| CN3715LM | 2.0 | 4.0 | — | — | — |
| LEO10551 | — | — | 11.1 | 11.1 | 11.1 |
| DM55 | 10.0 | 10.0 | 10.0 | 10.0 | 10.0 |
| Irgacure 819 | 3.0 | 3.0 | 3.0 | 1.5 | 0.75 |
| KIP160 | 3.0 | 3.0 | 3.0 | 2.0 | 2.0 |
| Esacure 1 | — | — | — | 2.0 | 2.0 |
| Omnipol TX | — | — | — | 1.5 | 1.5 |
| TegoGlide 410 | 0.6 | 0.6 | 0.6 | 0.6 | 0.6 |
| Ethanox 703 | 0.2 | 0.2 | 0.2 | 0.2 | 0.2 |
| Cyan Dispersion 1 | 9.0 | 9.0 | 9.0 | 9.0 | 9.0 |
| Total | 100.0 | 100.0 | 100.0 | 100.0 | 100.0 |
| Viscosity at 50° C. (mPa · s) | 6.84 | 7.32 | 8.61 | 9.27 | 9.09 |
| UV-LED Cure Response (mJ/cm$^2$) | 200 | 150 | 150 | 150 | 250 |
| Odor | 3 | 2 | 2 | 2 | 2 |
| Adhesion to 300 μm PET | 3 | 3 | 3 | 3 | 3 |
| Adhesion to 90 μm CPP | 2 | 2 | 2 | 2 | 2 |

LEO10551 = Ebecryl LEO10551, an acrylated amine (from Allnex)
Esacure 1 = difunctional alpha-hydroxy ketone photoinitiator (from Lamberti)

Example 14 was prepared similarly to Example 2, except that the acrylic resin Paraloid DM55, instead of Dianal ANUR, was used. Example 14 shows similar properties to Example 2, showing that different acrylic resins can be used.

By raising the concentration of the acrylated amine, CN3715LM, in Example 15, an improvement in the cure response of the ink was achieved, without detriment to the other print properties. Example 15 had a slightly reduced print odor. Example 16 is equivalent to Example 15, except that an alternative acrylated amine, LEO10551, was incorporated so that the ink had the same amine value (9 mg KOH/g). This demonstrates that different acrylated amines can be used.

Examples 17 and 18 use different photoinitiator blends. Importantly, these examples show that inks having reduced concentrations of the phosphine oxide photoinitiator, Irgacure 819, can be successfully formulated. Lower amounts of Irgacure 819 are desirable because it generates significant amounts of mesitaldehyde (2,4,6-trimethylbenzaldehyde) as a photodecomposition by-product. This decomposition product is extractable and migratable (see results in Tables 10 and 11).

Example 19

Cyan Inkjet Ink Containing Only Monofunctional Monomers

Comparative Example E was prepared. The composition of Comparative Example E is given in Table 6 below. Viscosity, cure response, odor, and adhesion were assessed as described above.

TABLE 6

Formulation, viscosity, cure response, odor and adhesion of Ex. E

| Component/Test | Ex. E (comparative) |
|---|---|
| PHEA | 48.0 |
| NVC | 26.4 |
| DM55 | 10.0 |
| Irgacure 819 | 3.0 |
| Esacure KIP160 | 3.0 |
| Tego Glide 410 | 0.4 |
| Ethanox 703 | 0.2 |
| Cyan Dispersion 2 | 9.0 |
| Total | 100.0 |
| Viscosity at 50° C. (mPa · s) | 13.0 |
| UV-LED Cure Response (mJ/cm$^2$) | 300 |
| Odor | 5 |
| Adhesion to 300 μm PET | 0 |
| Adhesion to 90 μm CPP | 2 |

PHEA = 2-Phenoxyethyl Acrylate
NVC = N-Vinyl Caprolactam
Cyan Dispersion 2 = A dispersion containing 25.0 wt % of Pigment Blue 15:4, the remainder comprising the dispersant (Efka 7476), stabilizers and CTFA
CTFA = Cyclic Trimethylol-propane Formal Acrylate.

Comparative Example E has the same concentration of acrylic polymer as do Examples 1, 2, 11, 12 and 13 and, even though it is based solely on monofunctional monomers, its viscosity is significantly higher than any of Examples 1, 2, 11, 12 and 13. This relatively high viscosity of 13.0 mPa·s indicates the maximum limit of the amount of acrylic polymer that can be included in inks prepared according to prior art formulations. Inks prepared according to the current invention can achieve significantly higher concentrations of acrylic polymer at similar viscosity, 15 wt %, as demonstrated by Examples 5 and 6. Furthermore, the UV-LED cure response of Comparative Example E was noticeably poorer than any of the aforementioned examples. Although Example E showed a good adhesion profile, the cured ink film had a very strong and very unpleasant attendant odor, indicative of significant amounts of uncured monomer.

Example 20

Cyan Inkjet Inks Containing Acrylated Silicone

Comparative Examples F and G were prepared according to the formulations in Table 7 below. The inks were tested for viscosity, cure response, odor, and adhesion to the substrate. The results are shown in Table 7.

TABLE 7

Formulation, viscosity, cure response, odor and adhesion of Ex. F and G

| Component | Ex. F (comparative) | Ex. G (comparative) |
|---|---|---|
| VEEA | 67.8 | 67.8 |
| LEO10553 | — | 5.0 |
| Irgacure 819 | 3.0 | 3.0 |
| Omnipol TX | 5.0 | 5.0 |
| Speedcure 7040 | 5.0 | 5.0 |
| TegoRad 2100 | 10.0 | 5.0 |
| Ethanox 703 | 0.2 | 0.2 |
| Cyan Dispersion 1 | 9.0 | 9.0 |
| Total | 100.0 | 100.0 |
| Viscosity at 50° C. (mPa · s) | 7.02 | 6.36 |
| UV-LED Cure Response (mJ/cm$^2$) | 200 | 150 |
| Odor | 5 | 4 |
| Adhesion to 300 μm PET | 4 | 3 |
| Adhesion to 90 μm CPP | 3 | 3 |

LEO10553 = Ebecryl LEO10553, an acrylated amine (from Allnex)
Speedcure 7040 = Polymeric Aminobenzoate (from Lambson)
TegoRad 2100 = Acrylated silicone (from Evonik)

Although Examples F and G had a useful cure response under the UV-LED light source, the prints were highly odorous.

Example 21

Cyan Inkjet Inks Containing N-Vinyl Caprolactam (NVC)

Comparative Examples H and I were prepared according to the formulations in Table 8 below. These examples were formulated with 5% and 10% of the monofunctional monomer NVC, respectively. The viscosity, cure response, odor, and adhesion of these inks are also shown in Table 8.

TABLE 8

Formulation, viscosity, cure response, odor and adhesion of Ex. H and I

| Component | Ex. H | Ex. I |
|---|---|---|
| VEEA | 67.2 | 62.2 |
| CN3715LM | 2.0 | 2.0 |
| NVC | 5.0 | 10.0 |
| DM55 | 10.0 | 10.0 |
| Irgacure 819 | 3.0 | 3.0 |
| KIP160 | 3.0 | 3.0 |
| TegoGlide 410 | 0.6 | 0.6 |
| Ethanox 703 | 0.2 | 0.2 |
| Cyan Dispersion 1 | 9.0 | 9.0 |
| Total | 100.0 | 100.0 |
| Viscosity at 50° C. (mPa · s) | 7.08 | 7.26 |
| UV-LED Cure Response (mJ/cm$^2$) | 200 | 200 |

TABLE 8-continued

Formulation, viscosity, cure response, odor and adhesion of Ex. H and I

| Component | Ex. H | Ex. I |
|---|---|---|
| Odor | 5 | 5 |
| Adhesion to 300 μm PET | 3 | 2 |
| Adhesion to 90 μm CPP | 2 | 2 |

Although having a low viscosity, good cure response, and adhesion, Examples H and I had a very poor odor.

Example 22

Extractable Monomers of Ex. 2 to 5, 11 to 13, and E

The following examples were tested for the extractable monomer: Examples 2, 3, 4, 5, 11, 12 and 13, and Comparative Example E. Table 9 provides the results for the analysis of the extractable monomer from prints of these inks.

TABLE 9

Level of extracted monomers

| Example | NPG(PO)DA (ppb) | 3-MePDDA (ppb) | VEEA (ppb) | CTFA (ppb) | PHEA (ppb) | NVC (ppb) |
|---|---|---|---|---|---|---|
| Ex. E (comparative) | — | — | — | 300 | 500 | >3000 |
| Ex. 1 | 50.0 | 22.5 | 31.5 | — | — | — |
| Ex. 2 | 40.0 | — | 67.0 | — | — | — |
| Ex. 3 | 77.0 | — | 107 | — | — | — |
| Ex. 4 | 72.0 | — | 104 | — | — | — |
| Ex. 5 | 68.0 | — | 111 | — | — | — |
| Ex. 11 | 35.0 | — | 48.0 | — | — | — |
| Ex. 12 | 29.0 | — | 39.0 | — | — | — |
| Ex. 13 | 50.0 | — | 90.0 | — | — | — |

From Table 9 it is clear that Comparative Example E, an ink based solely on monofunctional monomers, produces very much higher levels of unbound monomer in a cured ink film than do the tested Examples 1 to 5 and 11 to 13. These high levels of unreacted, and hence free, monomer, no doubt contribute to the odor emanating from cured prints of this ink and may well also explain why inks containing NVC adhere so well to plastic substrates. The amount of unreacted NVC was particularly high and NVC has relatively strong solvency compared with most other monomers used to prepare UV-curable inkjet products. The very high levels of unreacted monomer, as well as the odor of Comparative Example E would make it totally unsuited to applications requiring low migration potential, such as the printing of food packaging.

Examples 2 to 5 and 11 to 13 tested for extractable monomer cured to an extent such that only low concentrations of unreacted monomer were detectable in the methanol extracts of cured prints. Thus, the advantage of using inks based solely or predominantly on multifunctional monomers for use in sensitive applications such as the printing of food packaging is clearly demonstrated.

Example 23

Set-Off Migratable Monomers of Ex. 5

As a further experiment to demonstrate that inks prepared according to the present invention do indeed have low migration potential, Example 5 was further tested for set-off migratables according to the method described previously. The amount of both NPG(PO)DA and VEEA was less than 3.0 ppb, indicating that these inks would be suitable for the printing of food packaging, and other applications where low migration is required.

Example 24

Extractable Monomers and Mesitaldehyde of Ex. 14 to 18, and F to I

Cured ink films of inks of Examples 14 to 18, and comparative examples F, G, H, and I were tested for extractable monomers and mesitaldehyde (decomposition product of Irgacure 819). The results are shown in Table 10 below.

TABLE 10

Extractable monomers and mesitaldehyde

| Example | Extractable NPG(PO)DA (ppb) | Extractable VEEA (ppb) | Extractable NVC (ppb) | Extractable Mesitaldehyde (ppb) |
|---|---|---|---|---|
| Example 14 | 8.0 | 15.1 | — | 275 |
| Example 15 | 3.7 | 13.3 | — | 316 |
| Comparative Example H | 5.1 | 16.9 | 1800 | 364 |
| Comparative Example I | 6.8 | 26.5 | 4900 | 377 |
| Example 16 | 3.4 | 12.4 | — | 292 |
| Example 17 | 3.5 | 15.8 | — | 128 |
| Example 18 | 8.6 | 20.7 | — | 92 |
| Comparative Example F | 246 | 433 | — | 253 |
| Comparative Example G | 450 | 1220 | — | 264 |

The results in Table 10 show that inks formulated with the monofunctional monomer NVC (Examples H and I) have high levels of uncured, extractable monomer, which could contaminate packaged products. Examples F and G had significant amounts of unreacted monomer and mesitaldehyde. Examples 17 and 18, which were formulated with an alternative photoinitiator blend, using less Irgacure 819, had much lower levels of extractable mesitaldehyde.

The results also show that inks formulated with DM55, rather than ANUR, have lower levels of unreacted monomer. Compare the results of Example 14 to the results of Example 2 in Table 9.

Example 25

Migratable Monomers and Mesitaldehyde of Ex. 14 to 18, and F to I

Cured ink films of inks of Examples 14 to 18, and comparative examples F, G, H, and I were tested for migratable monomers and mesitaldehyde. The results are shown in Table 11 below.

TABLE 11

Migratable monomers and mesitaldehyde

| Example | Migratable NPG(PO)DA (ppb) | Migratable VEEA (ppb) | Migratable NVC (ppb) | Migratable Mesitaldehyde (ppb) |
|---|---|---|---|---|
| Example 14 | <3.0 | <3.0 | — | 65 |
| Example 15 | <3.0 | <3.0 | — | 71 |

TABLE 11-continued

Migratable monomers and mesitaldehyde

| Example | Migratable NPG(PO)DA (ppb) | Migratable VEEA (ppb) | Migratable NVC (ppb) | Migratable Mesitaldehyde (ppb) |
|---|---|---|---|---|
| Comparative Example H | <3.0 | <3.0 | >200 | 83 |
| Comparative Example I | <3.0 | 4.1 | >200 | 85 |
| Example 16 | <3.0 | <3.0 | — | 67 |
| Example 17 | <3.0 | <3.0 | — | 30 |
| Example 18 | <3.0 | <3.0 | — | 18 |
| Comparative Example F | 15.6 | 17.9 | — | 64 |
| Comparative Example G | 28.8 | 53.7 | — | 63 |

Examples F and G had high levels of migratable monomer and high levels of migratable mesitaldehyde. Examples H and I had high levels of migratable NVC and mesitaldehyde. Examples 17 and 18, using less Irgacure 819, showed reduced levels of migratable mesitaldehyde. These examples show that inks that have low levels of extractable components also have low levels of migratable components.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A radiation-curable inkjet ink or coating composition comprising:
    a) one or more acrylic polymers in an amount of greater than 10 wt % based on a total weight of the ink or coating; and
    b) one or more multifunctional monomers having two or more polymerizable groups per molecule;
wherein at least one multifunctional monomer is a hybrid monomer containing two or more different polymerizable groups per molecule;
wherein the radiation-curable inkjet ink or coating composition is non-aqueous;
wherein the composition contains greater than or equal to 40 wt % of polymerizable monomers, based on the total weight of the ink or coating;
wherein the composition contains one or more photoinitiators selected from the group consisting of thioxanthones, phosphine oxide compounds, alpha-hydroxy ketones, benzophenones, aminobenzoates, alpha-aminoalkylphenones, benzoin ethers and benzyl ketals, wherein at least one photoinitiator is a phosphine oxide; and
wherein a concentration of any blend of phosphine oxide photoinitiators is less than 1.0 wt % based on the total weight of the ink or coating composition.

2. The composition of claim 1, wherein the one or more acrylic polymers are present in an amount of greater than 12 wt % based on the total weight of the ink or coating composition.

3. The composition of claim 1, wherein the at least one multifunctional hybrid monomer contains both (meth)acrylate and vinyl ether functional groups.

4. The composition of claim 3, in which the at least one multifunctional monomer containing both (meth)acrylate and vinyl ether functional groups is 2-(2-vinyloxyethoxy) ethyl acrylate.

5. The composition of claim 1, containing a colorant.

6. The composition of claim 5, wherein the colorant is an organic or inorganic pigment, or a dye.

7. The composition of claim 1, wherein total concentration of the one or more photoinitiators is less than 8.0 wt % based on the total weight of the ink or coating composition.

8. The composition of claim 1, wherein at least one or more of the thioxanthones is a polymeric thioxanthone and/or the at least one or more polymeric thioxanthone is present in a concentration of less than 2.0 wt % based on the total weight of the ink or coating composition.

9. The composition of claim 1, having a viscosity of less than 15.0 mPa·s at 50° C.

10. A printed article comprising the inkjet ink or coating composition of claim 1, and a substrate.

11. The printed article of claim 10, wherein the substrate is selected from the group consisting of plastic, aluminum, glass, flexible packaging, rigid packaging, and the non-contact surface of any food packaging.

12. A method of printing comprising:
    a) applying the ink or coating composition of claim 1 onto a substrate; and
    b) curing the applied ink or coating by UV-LED radiation; and
    wherein a total UV-dose of the UV-LED radiation is less than 300 mJ/cm$^2$.

13. The method of claim 12, wherein the ink or coating composition is printed via a single pass printing or coating operation.

14. The method of claim 12, wherein the ink or coating is cured by UV-LED radiation within 5 seconds of being printed.

15. The composition of claim 1, wherein when the composition contains multifunctional monomers that are not hybrid monomers, the composition contains greater than 25 wt % of one or more multifunctional hybrid monomers, based on the total weight of multifunctional monomers.

16. The composition of claim 1, which contains less than 5 wt % of monofunctional monomers based on the total weight of the ink or coating composition.

* * * * *